United States Patent
Goodsell et al.

(10) Patent No.: US 10,153,121 B2
(45) Date of Patent: Dec. 11, 2018

(54) GFCI WITH MISWIRE PROTECTION HAVING UNITARY RECEPTACLE AND LOAD CONDUCTORS AFTER PROPER INSTALLATION

(75) Inventors: John Phillip Goodsell, Stratford, CT (US); Sorin Ioan Mortun, Irvington, NY (US); Robert Fanzutti, Naugatuck, CT (US)

(73) Assignee: Hubbell Incorporated, Shelton, CT (US)

( * ) Notice: Subject to any disclaimer, the term of this patent is extended or adjusted under 35 U.S.C. 154(b) by 825 days.

(21) Appl. No.: 12/292,855

(22) Filed: Nov. 26, 2008

(65) Prior Publication Data
US 2009/0147417 A1   Jun. 11, 2009

Related U.S. Application Data

(60) Provisional application No. 60/996,689, filed on Nov. 30, 2007.

(51) Int. Cl.
*H02H 3/00* (2006.01)
*H01H 83/04* (2006.01)
*H02H 3/33* (2006.01)

(52) U.S. Cl.
CPC ............. *H01H 83/04* (2013.01); *H02H 3/338* (2013.01); *Y10T 29/49826* (2015.01)

(58) Field of Classification Search
CPC ..................................................... H02H 3/338
USPC ........................................................... 361/42
See application file for complete search history.

(56) References Cited

U.S. PATENT DOCUMENTS

| | | | |
|---|---|---|---|
| 3,596,219 A * | 7/1971 | Erickson | 335/17 |
| 4,048,608 A * | 9/1977 | Riendeau et al. | 337/74 |
| 4,616,206 A * | 10/1986 | Bridges et al. | 337/71 |
| 5,805,046 A * | 9/1998 | Hassler et al. | 337/168 |
| 6,111,733 A * | 8/2000 | Neiger et al. | 361/42 |
| 6,522,510 B1 | 2/2003 | Finlay et al. | |
| 6,864,766 B2 | 3/2005 | DiSalvo et al. | |
| 7,133,266 B1 | 11/2006 | Finlay | |
| 7,164,563 B2 | 1/2007 | Chan et al. | |
| 7,167,066 B2 | 1/2007 | Wang | |
| 7,184,250 B2 | 2/2007 | Bonilla et al. | |
| 7,187,526 B2 | 3/2007 | DiSalvo | |
| 7,196,886 B2 | 3/2007 | Chan et al. | |
| 7,199,587 B2 | 4/2007 | Hurwicz | |
| 7,212,386 B1 | 5/2007 | Finlay, Sr. et al. | |
| 7,221,166 B2 | 5/2007 | Saha et al. | |
| 7,239,491 B1 | 7/2007 | Morgan et al. | |
| 7,256,973 B1 | 8/2007 | Radosaveljevic et al. | |

(Continued)

*Primary Examiner* — Ronald W Leja
(74) *Attorney, Agent, or Firm* — Dickinson Wright, PLLC

(57) ABSTRACT

An improved GFCI device prevents miswiring. Load conductors are electrically isolated from receptacle conductors. Normally closed contacts are held open by a miswire prevention mechanism, such that if power is connected to the load contacts, power cannot be delivered to the GFCI device, the receptacle conductors or the line conductors. Once power is properly connected to the line conductors, a proper wiring detection circuit activates the miswire prevention mechanism to release the normally closed contacts, thereby electrically connecting the receptacle conductors and the load conductors. After proper installation, the receptacle conductors are preferably permanently connected to the load conductors. The device is preferably shipped in the reset state.

29 Claims, 8 Drawing Sheets

(56) References Cited

U.S. PATENT DOCUMENTS

| | | |
|---|---|---|
| 7,260,932 B1 * | 8/2007 | Klimowicz ............... 60/527 |
| 7,295,410 B1 * | 11/2007 | Packard et al. ............ 361/42 |
| 7,298,410 B2 | 11/2007 | Morgan et al. |
| 7,307,821 B2 | 12/2007 | Wang |
| 7,345,489 B2 | 3/2008 | DeHaven |
| 7,355,827 B2 | 4/2008 | Wang |
| 7,375,938 B1 | 5/2008 | Radosaveljevic et al. |
| 7,400,477 B2 | 7/2008 | Campolo et al. |
| 7,403,086 B2 | 7/2008 | Wu et al. |
| 7,414,818 B2 | 8/2008 | Shi |
| 7,446,988 B2 | 11/2008 | Balakrishnan et al. |
| 7,643,257 B1 * | 1/2010 | Morgan et al. ............ 361/42 |
| 2005/0117264 A1 | 6/2005 | Aromin |
| 2005/0206175 A1 * | 9/2005 | Browne et al. ............ 292/253 |
| 2006/0279886 A1 | 12/2006 | Huang et al. |
| 2006/0285262 A1 | 12/2006 | Neiger |
| 2007/0188949 A1 | 8/2007 | Bonilla et al. |
| 2007/0206337 A1 | 9/2007 | Aromin |
| 2007/0018763 A1 | 12/2007 | Wang |
| 2007/0279162 A1 * | 12/2007 | Zhang et al. ............ 335/21 |
| 2008/0186642 A1 | 8/2008 | Campolo et al. |

\* cited by examiner

GFCI WITH MISWIRE PROTECTION HAVING UNITARY RECEPTACLE AND LOAD CONDUCTORS AFTER PROPER INSTALLATION

CROSS REFERENCE TO RELATED PATENT APPLICATIONS

This application claims the benefit under 35 U.S.C. § 119(e) of Provisional Patent Application No. 60/996,689 filed Nov. 30, 2007, the entire disclosure of which is hereby incorporated by reference.

FIELD OF THE INVENTION

The present invention is related to ground fault protection circuits. More particularly, the present invention is related to ground circuit interrupting receptacles that prevent miswiring during installation.

DESCRIPTION OF THE RELATED ART

A ground fault circuit interrupter (GFCI) is a safety device intended to protect the user from electric shock. Electric shock can occur in the case of electric current flowing from the hot supply through the user to ground. Ground Fault Circuit Interrupters sense an imbalance in current flowing between hot and neutral conductors, which would indicate current flowing from a conductor to ground, and cut off power to the load. A ground fault receptacle (GFR) is a GFCI in the form of a receptacle. The GFR is connected in line and when properly wired provides protection at the face of the receptacle as well as to any additional devices or receptacles connected through the GFR load terminals.

Conventional GFR devices suffered a problem in that the load and face terminals are permanently connected together. Accordingly, if an installer connected line power to the load terminals rather than the line terminals, power would be present at the receptacle face terminals even if the GFR was tripped. Such a mis-wired device could still sense a ground fault, trip and be reset, fooling users into thinking they were protected when they were not. Many strategies have been employed in an attempt to overcome the mis-wiring problem. Products are typically marked very clearly to indicate how the device should be properly wired, but installers can still make mistakes. Devices have incorporated various means to detect a mis-wired device, and to sound an alarm or provide a visual indication of the error. Finally, some devices are designed to continuously trip if line power is connected to the load terminals. In these devices the line, load and receptacle terminals are designed to be electrically isolated when the device is tripped. However, these devices can be significantly more complex and expensive to manufacture. Some require dedicated microprocessors which undergo a startup routine each time the GFR is powered up.

Accordingly, what is needed is a GFR which prevents miswiring by an installer, and which is simpler and less expensive to manufacture.

SUMMARY OF THE INVENTION

The above problems are overcome and other advantages realized by embodiments of the invention described herein.

According to one aspect of the invention, a GFR is provided with an open set of electrical contacts between the load and receptacle terminals which can be closed under correct wiring conditions. The load terminals are electrically isolated from the line and receptacle terminals such that if power is initially applied to the load terminals, no power will be available to the receptacle contacts or to any circuitry in the receptacle or to the line contacts. Accordingly, a mis-wired device will not transmit any power to the receptacle or downstream devices, and a user will know that the device is miswired.

The receptacle is preferably shipped from the factory to the customer with the GFCI solenoid contacts between the line and the face contacts in the closed or energized position. Energizing the line terminals allows power to flow from the line terminals to the receptacle contacts. A proper wiring detection circuit detects power connected to the receptacle contacts, and activates a miswire prevention mechanism. The miswire prevention mechanism prevents the receptacle and load conductors from being electrically connected until activation. The miswire prevention mechanism is preferably a one-shot device such as a mechanical latch, or the like, which when released allows an electrical contact of the receptacle conductor to contact an electrical contact of the load conductor. Preferably, once the miswire prevention mechanism has been activated, the load and receptacle conductors become permanently electrically connected.

According to other embodiments of the invention, the miswire prevention mechanism can be a mechanical latch triggered by a solenoid, a mechanical latch triggered by a heated bi-metal strip, a destructible fuse restraining a spring loaded electrical contact, a low-temperature solder joint restraining a spring loaded electrical contact, a heat deformable material, or any other suitable mechanism.

BRIEF DESCRIPTION OF THE DRAWING FIGURES

The above and other objects, features, and advantages of certain embodiments of the present invention will be more apparent from the following description taken in conjunction with the accompanying drawings, in which.

Throughout the drawings, like reference numbers will be understood to refer to like elements, features and structures.

DETAILED DESCRIPTION OF EXEMPLARY EMBODIMENTS

The matters set forth in the following description, such as a detailed construction and elements, are provided to assist in a comprehensive understanding of embodiments of the invention and are intended to be merely exemplary. Accordingly, a skilled artisan will recognize that various changes and modifications of the embodiments described herein can be made without departing from the scope and spirit of the invention. Also, descriptions of well-known functions and constructions are omitted for clarity and conciseness.

Exemplary embodiments of the present invention will now be described in greater detail with reference to the accompanying drawings.

Figure 1:
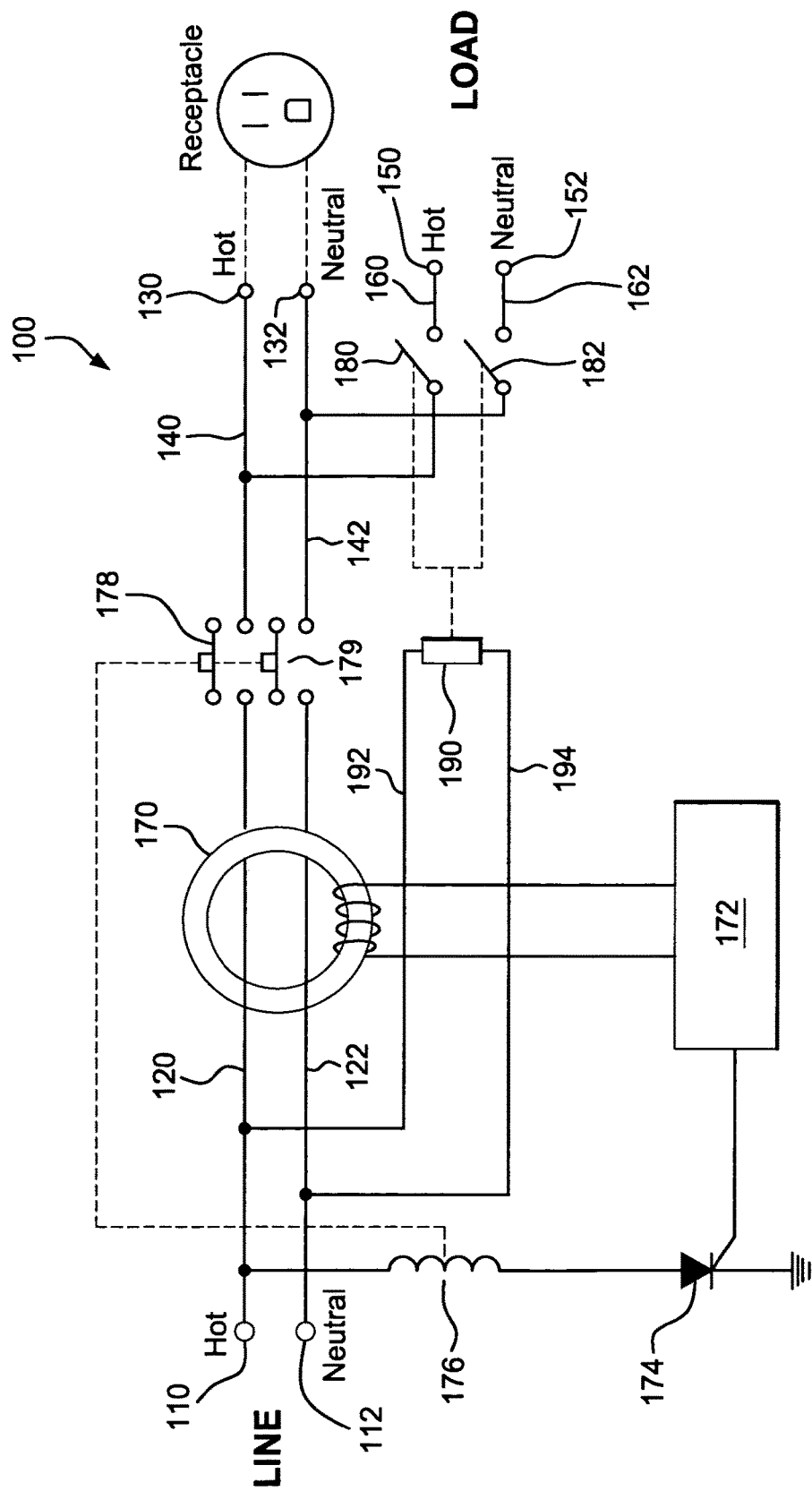
FIGS. 1 and 2 are schematic illustrations of a first exemplary embodiment of the present invention.
Figure 2:
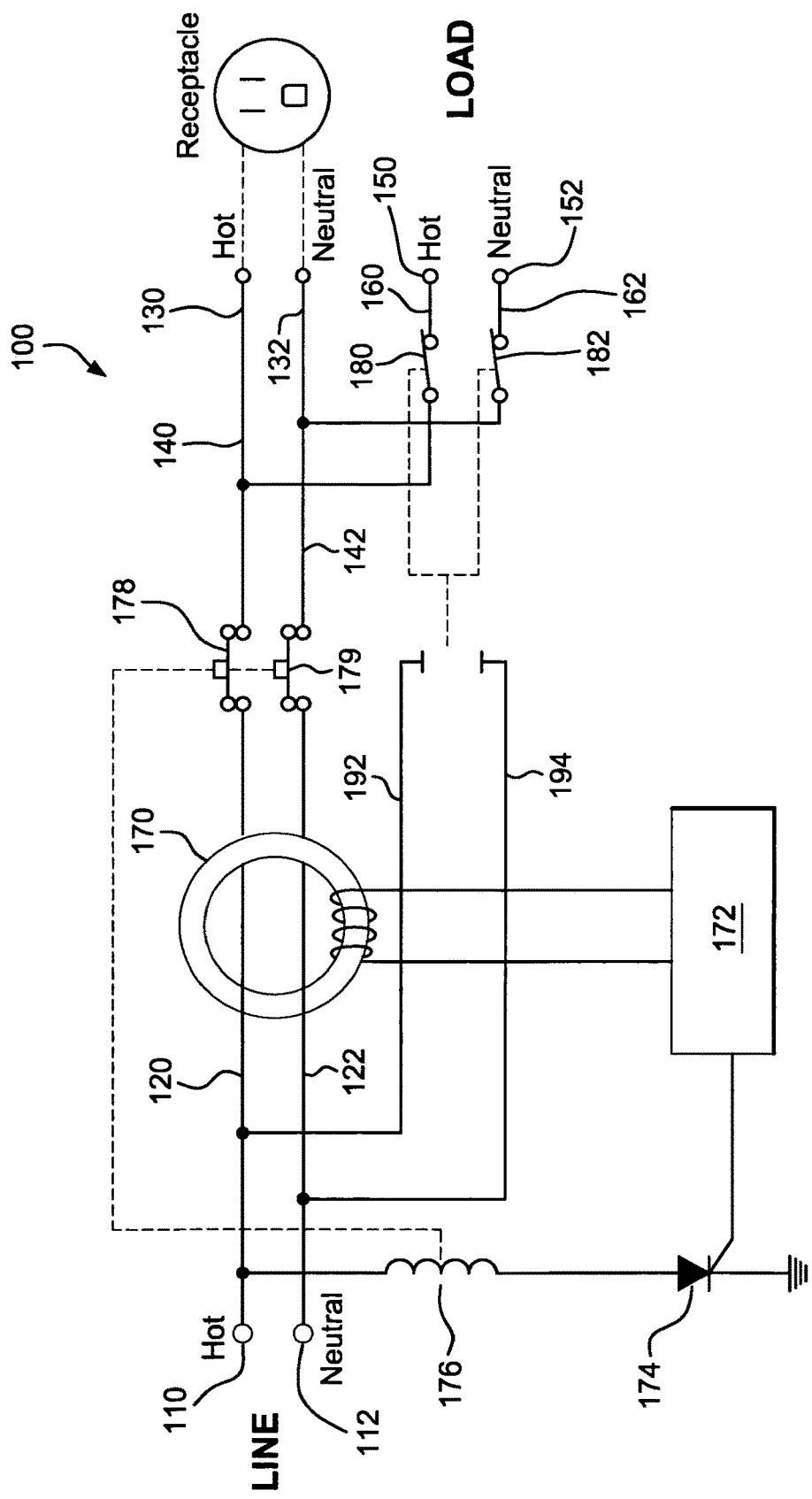

FIGS. 1-2 illustrate a first embodiment of the present invention. FIGS. 1-2 illustrate a simplified GFR device 100 having line hot and line neutral contacts 110, 112 connected to line hot and line neutral conductors 120, 122. GFR device 100 also includes hot and neutral receptacle contacts 130, 132 connected to hot and neutral receptacle conductors 140, 142, and hot and neutral load contacts 150, 152, connected to hot and neutral load conductors 160, 162. As in a conventional GFR device, device 100 includes a sensing coil 170 and GFCI circuit 172. When sensing coil 170 senses a difference in current between line conductors 120, 122, sensing coil 170 provides a signal to GFCI circuit 172, which in turn provides a trigger signal to SCR 174. When SCR 174 is triggered, solenoid 176 is energized, tripping the device and opening normally open contacts 178, 179. When the user presses a reset button on the device (not shown), a mechanical latch pulls normally open contacts 178, 179 closed, allowing power to be provided from the line conductors 120, 122 to the receptacle conductors 140, 142 and the load conductors 160, 162.

However, according to an exemplary embodiment of the invention, device 100 includes additional components whose function will be described below. First, load conductors 160, 162 are initially electrically isolated from receptacle terminals 140, 142 by normally closed contacts 180, 182. Contacts 180, 182 are referred to generally as a miswiring prevention mechanism. Miswiring prevention mechanism 180, 182 is retained by proper wiring detection element 190. Together with conductors 192, 194, proper wiring detection element 190 forms a proper wiring detection circuit. As will be appreciated, if device 100 is initially miswired, such that power is connected to the load terminals 150, 152, power will advantageously not be delivered to any other portion of the device 100 because load conductors 160, 162 are electrically isolated from receptacle conductors 140, 142. Accordingly, no power is available at either the receptacle or the line terminals (in case downstream devices were improperly wired to the line terminals).

When power is properly connected to the line terminals 110, 112, the proper wiring detection circuit will be energized, causing current to flow through proper wiring detection element 190. Proper wiring detection element 190 can take many forms, and one such form is a fuse that will blow. When fuse 190 blows, miswiring prevention mechanism 180, 182, is no longer restrained, an upon being released normally closed contacts 180, 182 close, electrically connecting the receptacle conductors 140, 142 to the load conductors 160, 162, as shown in FIG. 2.

It should be appreciated that the arrangement described above is very effective at preventing miswiring, or at least preventing any harm resulting from miswiring, and alerting the installer that the device is not working properly as a result of the miswiring. Further, it should be appreciated that the miswire prevention mechanism and proper wiring detection circuit can be constructed inexpensively and simply. In a preferred embodiment they are only required to function once. Presently contemplated forms of proper wiring detection element 190 include a fuse mechanically tied to normally closed contacts 180, 182, as described above, or a low temperature solder joint connected to contacts 180, 182, such that current passing through solder joint 190 causes the solder to melt and release contacts 180, 182. Element 190 can be a second solenoid, or even the main solenoid (176), and can release a mechanical latch the retrains contacts 180, 182. Element 190 can be a bimetal strip that initially restrains a latch mechanism, and upon heating bends to release the latch. Element 190 can be a heater element that causes a deformable material such as plastic to deform and release contacts 180, 182, or that heats a bimetal strip, causing the strip to bend and release a latch.

The embodiment of FIGS. 1 and 2 illustrates the proper wiring detection circuit connected to line conductors 120, 122. It should be appreciated that in this embodiment, the state of contacts 178, 179 is irrelevant to the function of proper wiring detection circuit 190, 192, 194, and miswire prevention mechanism 180, 182.

Figure 3:
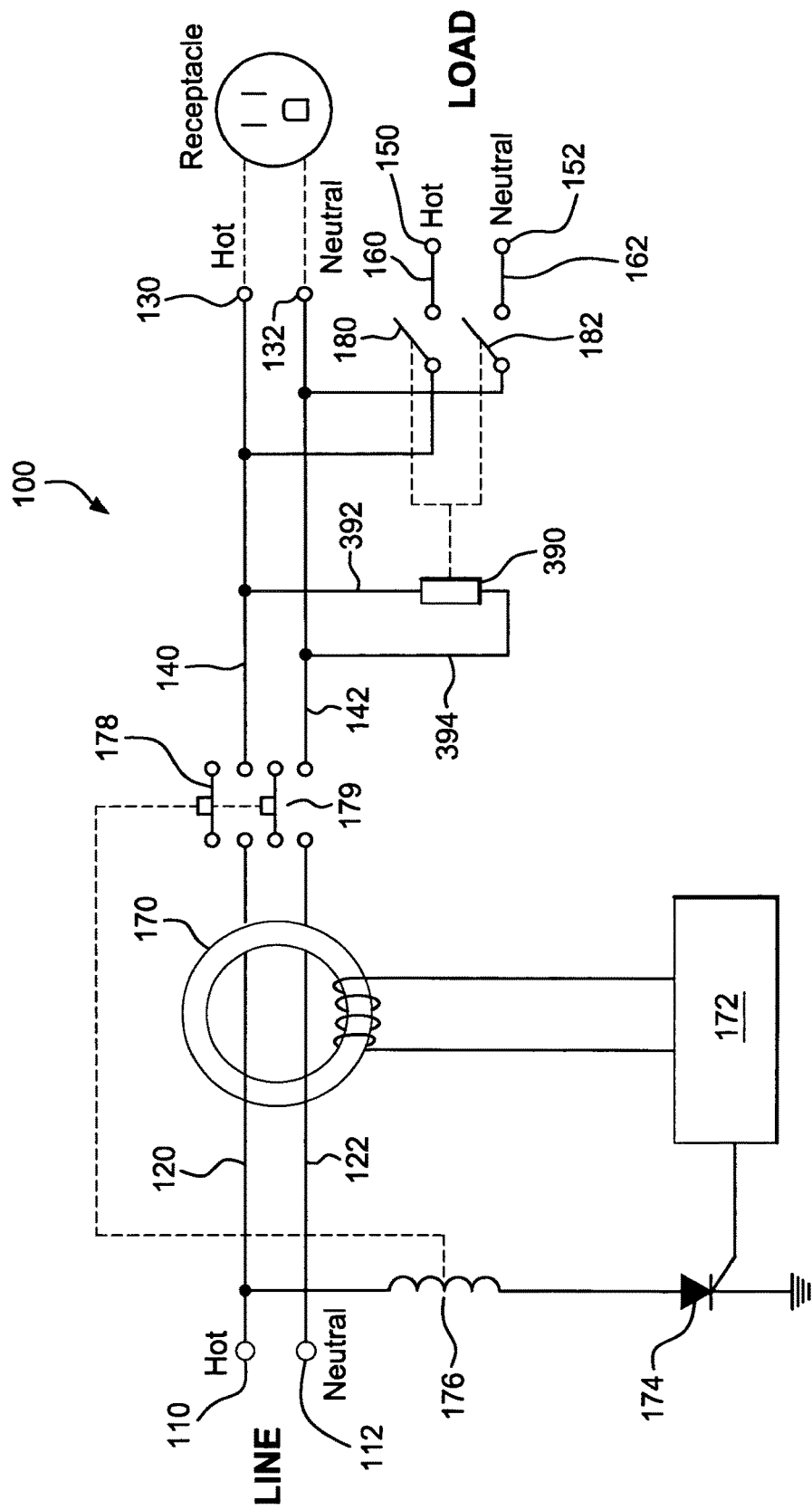
FIGS. 3 and 4 are schematic illustrations of a second exemplary embodiment of the present invention.
Figure 4:
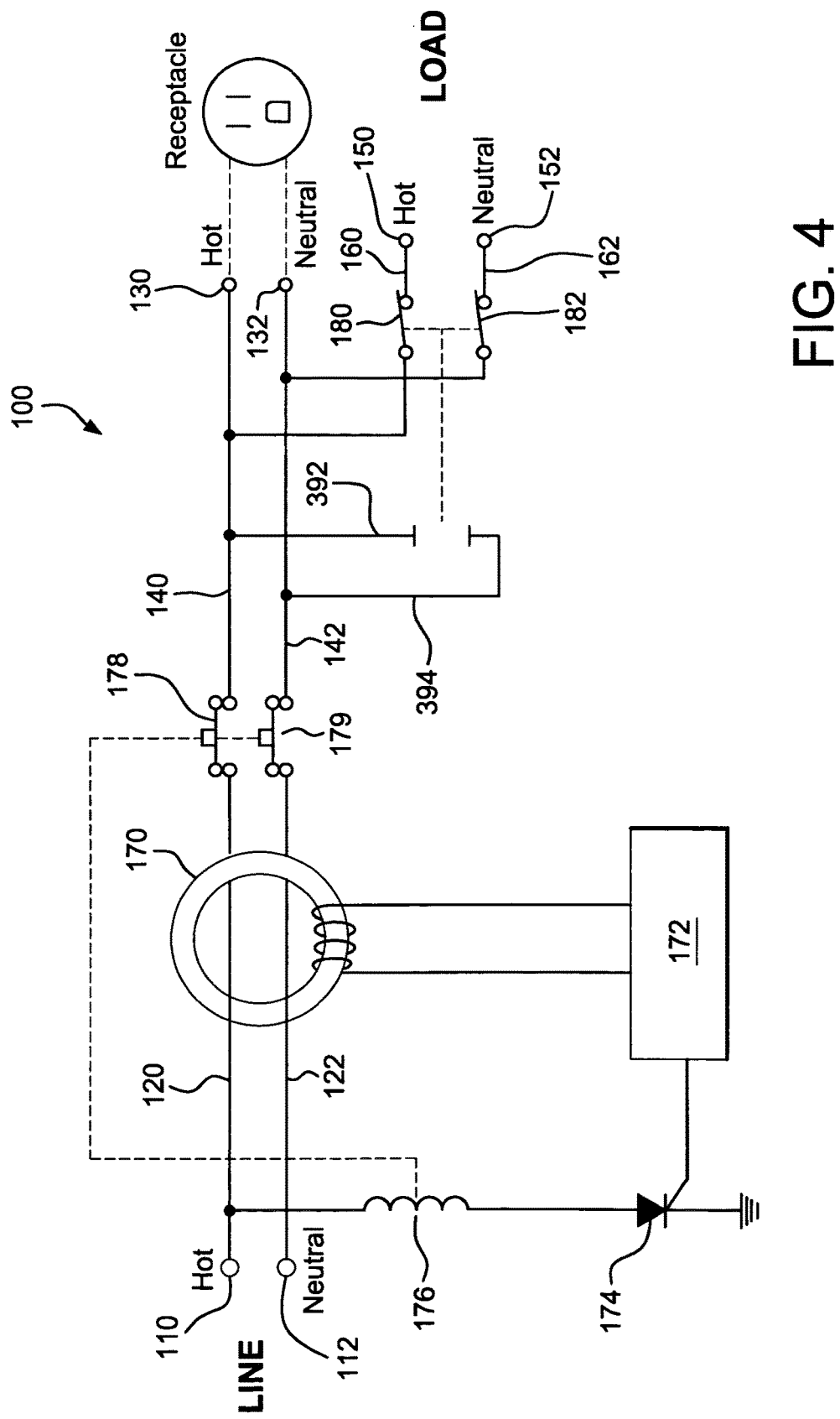

FIGS. 3 and 4 illustrate a second embodiment of the present invention. The embodiment illustrated in FIGS. 3 and 4 is substantially the same as the first embodiment, and accordingly like elements and functions will not be described again. As shown in FIG. 3, proper wiring detection circuit 390, 392, 394 is connected to the receptacle conductors 140, 142, rather than the line conductors 120, 122. Accordingly, it is necessary for the device 100 to be in the reset state in order for proper wiring detection circuit 390, 392, 394 to activate miswiring prevention mechanism 180, 182. In this embodiment, it is preferred that device 100 is shipped in the reset state.

As shown in FIG. 4, when power is properly connected to the line terminals 110, 112, and the device is reset such that normally open contacts 178, 179 are closed, proper wiring detection circuit 390, 392, 394 is energized, and activates miswire prevention mechanism 180, 182.

Figure 5:
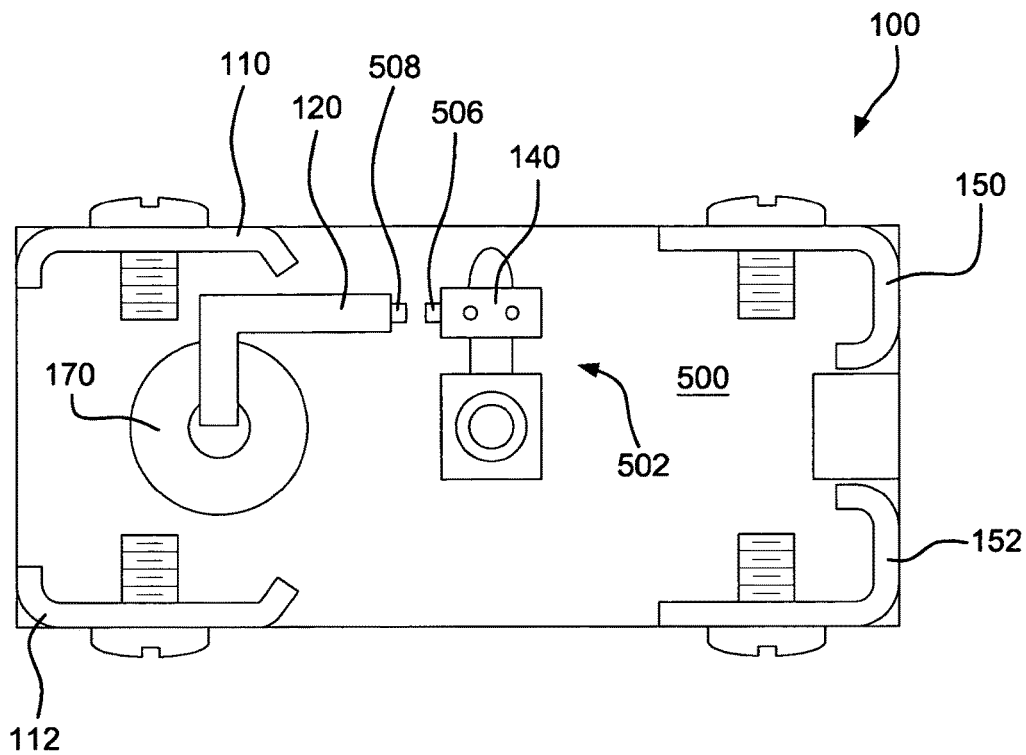
FIG. 5 is a top view of a device according to an exemplary embodiment of the present invention.
Figure 6:
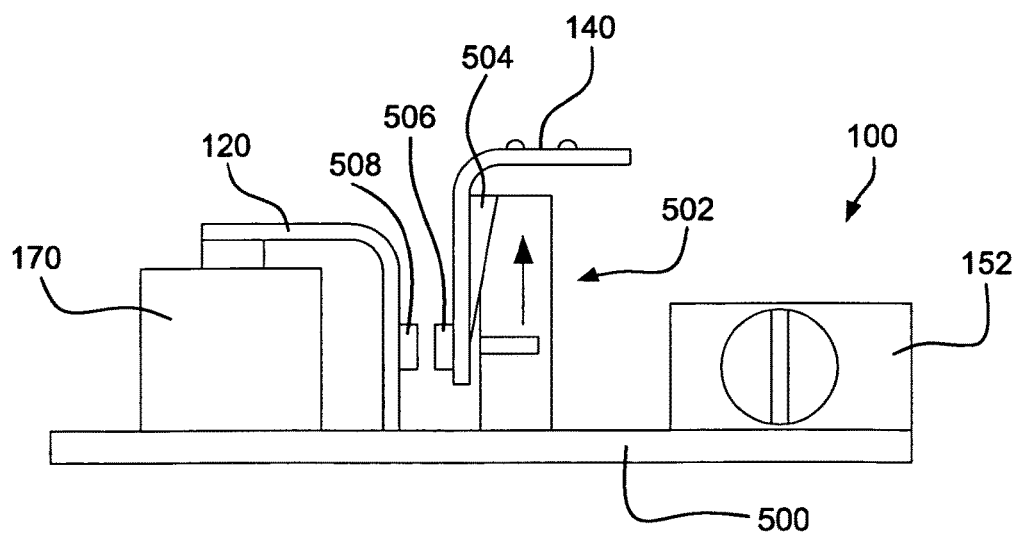
FIG. 6 is a side view of the device shown in FIG. 5.

FIG. 5-8 illustrate a mechanical layout of an exemplary embodiment of the present invention. FIG. 5 is a top view and FIG. 6 is a side view of the device 100. Sensing coil 170 is mounted on PC board 500. Hot and neutral line contacts 110, 112 are shown, and for simplicity only hot line conductor 120 is shown. Hot and neutral load contacts 150, 152 are shown. Load contacts 150, 152 are of course connected to load conductors, but load conductors are not shown for simplicity. Hot receptacle conductor 140 is shown. During normal operation, reset latch mechanism 502 is pulled upwards when device 100 is reset, pushing cam 504, and causing movable receptacle contact 506 to contact fixed line conductor contact 508.

Figure 7:
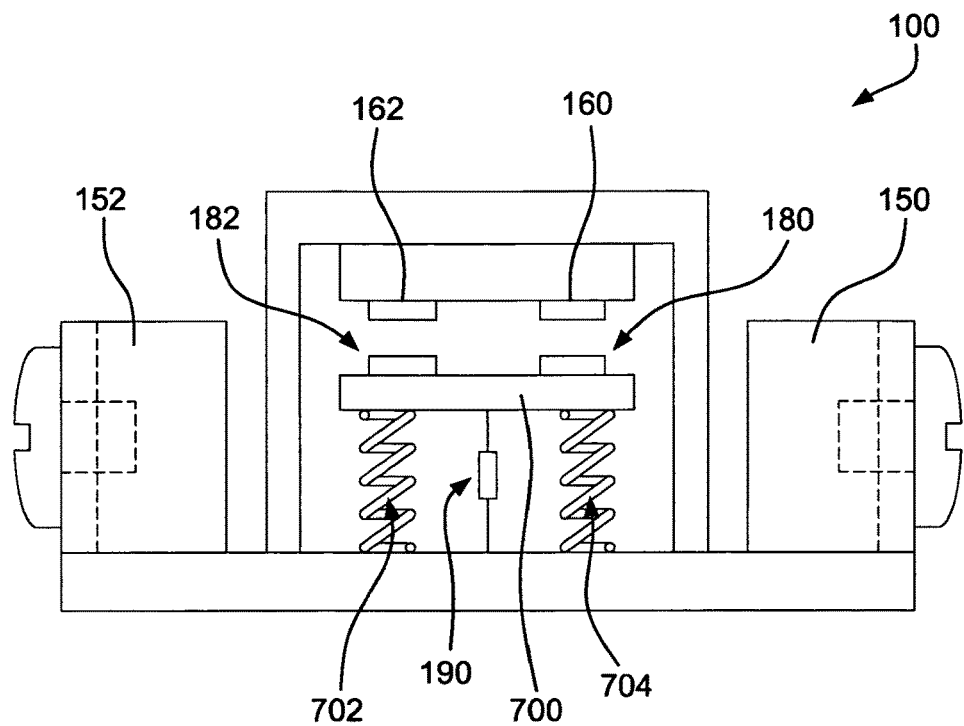
FIG. 7 is an end view of the device shown in FIG. 5.
Figure 8:
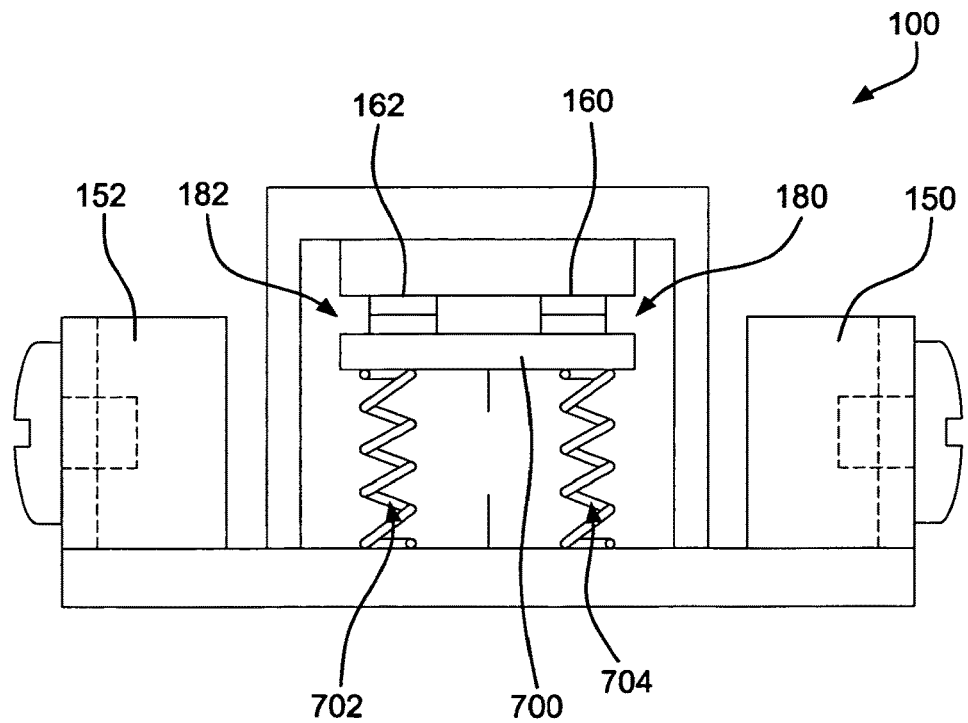
FIG. 8 is an end view of the device shown in FIG. 5 after activation of a miswire prevention mechanism according to an embodiment of the present invention.

FIG. 7 is an end view of device 100, showing contacts 180, 182, which are arranged on carriage 700. Carriage 700 is biased upwards by springs 702, 704, but restrained by the miswire prevention mechanism comprising element 190. As shown in FIG. 8, when element 190 blows out, carriage 700 is released and contacts 180, 182 come into contact with load conductors 160, 162. Element 190 may be a destructible fuse, a low power rated resistor, or a solder joint, for example. Any device which open circuits and mechanically releases the carriage 700 would be suitable.

Figure 9:
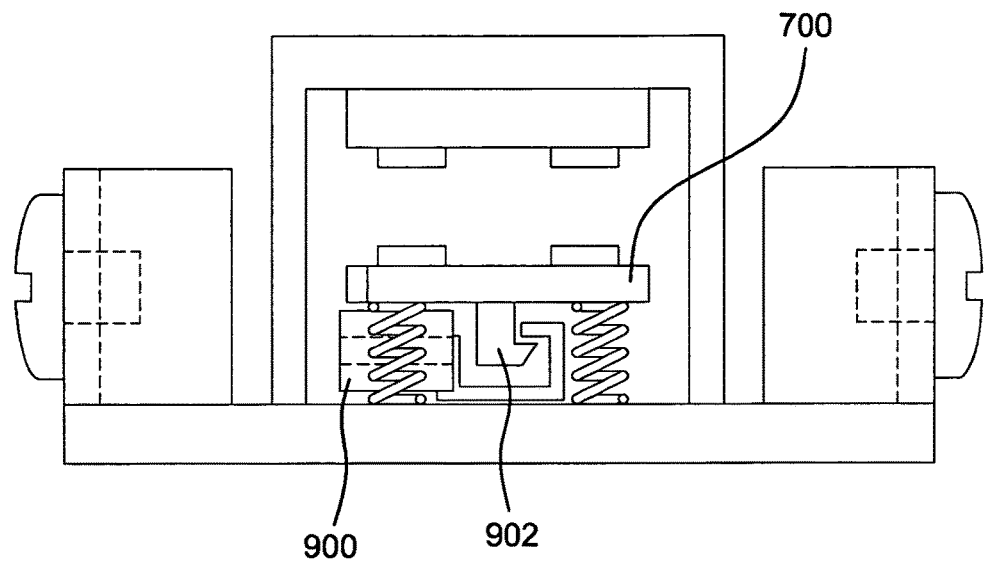
FIG. 9 is an end view of an alternative embodiment of the present invention.
Figure 10:
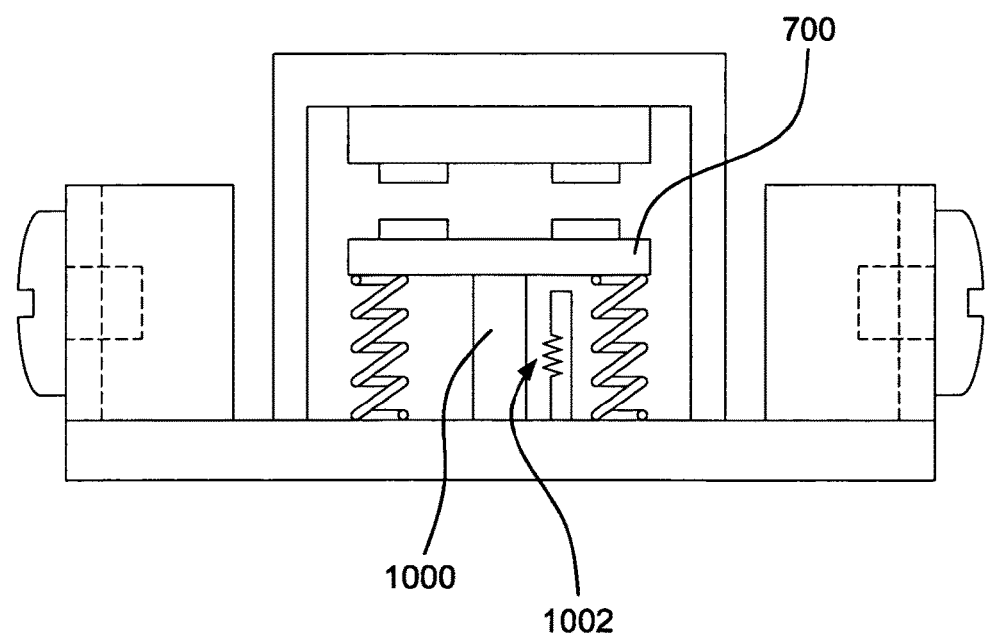
FIG. 10 is an end view of another alternative embodiment of the present invention.
Figure 11:
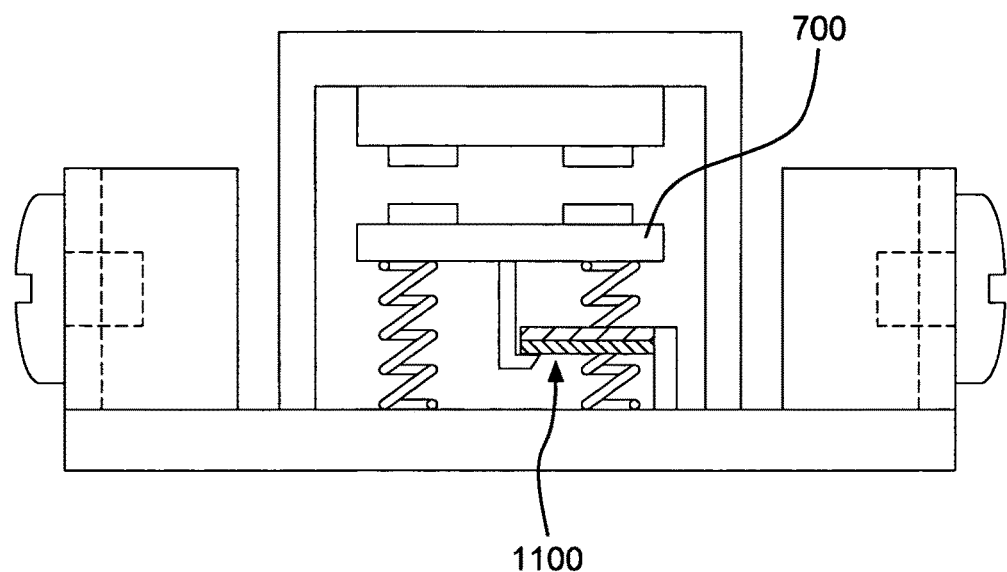
FIGS. 11 and 12 are end views of yet another alternative embodiment of the present invention.
Figure 12:
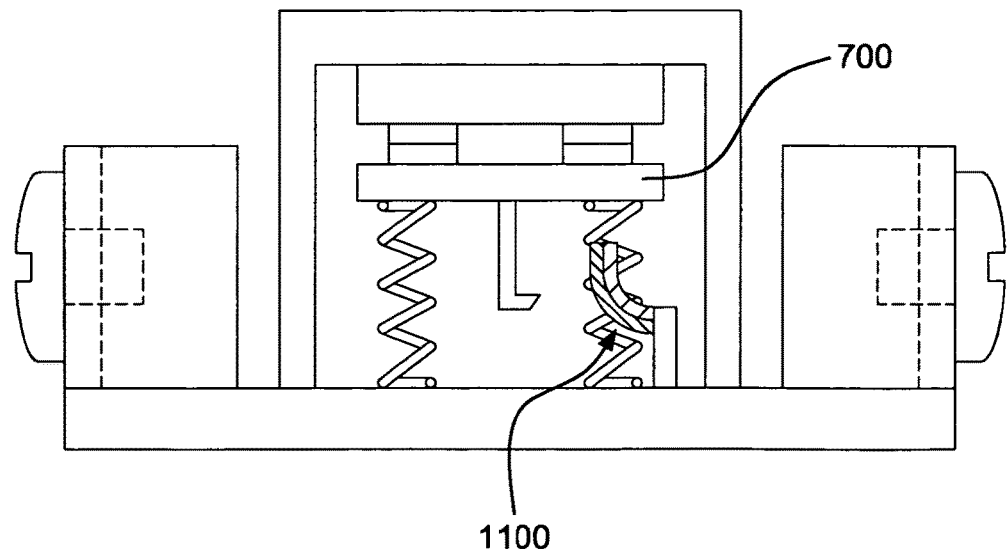

FIG. 9 illustrates a solenoid 900 adapted to release latch hook 902. FIG. 10 illustrates heat deformable member 1000 retaining carriage 700, along with heater element 1002, which can deform heat deformable member 1000 and thereby release carriage 700. FIGS. 11 and 12 illustrate a bimetal element 1100 that is heated, and bends upon heating to release carriage 700. Bimetal element 1100 may also be a shape memory alloy, such as Nitinol wire. Of course, bimetal element 1100 may be heated by a current passing through bimetal element 1100, or by a nearby heater element, as discussed above with respect to FIG. 10 (element 1002).

Embodiments of this invention can advantageously replace conventional miswire circuits. The spring loaded contact closure components 180, 182 advantageously do not have to be expensive switch contacts because they only need to close once.

What is claimed is:

1. A ground fault circuit interrupting device for preventing miswiring during installation, the device comprising:
   at least one line terminal;
   at least one load terminal electrically isolated from the at least one line terminal when the device is in a tripped condition and electrically connected to the at least one line terminal when the device is in a reset condition;
   at least one receptacle terminal electrically connected to one of a hot receptacle conductor and a neutral receptacle conductor and electrically isolated from the at least one load terminal prior to installation; and
   a proper wiring detection circuit connected to said hot and neutral receptacle conductors that causes said receptacle terminal to become electrically connected to said load terminal only a first time a source of power is connected to said at least one line terminal at the same time the device is in the reset condition.

2. The ground fault circuit interrupting device of claim 1, further comprising a fault detection circuit adapted to detect a fault condition, and cause the device to operate in the tripped condition upon the detection of said fault condition.

3. The ground fault circuit interrupting device of claim 2, wherein said fault condition is a ground fault.

4. The ground fault circuit interrupting device of claim 1, further comprising a miswire prevention mechanism; and wherein said proper wiring detection circuit activates said miswire prevention mechanism when a source of power is connected to said at least one line terminal.

5. The ground fault circuit interrupting device of claim 4, wherein said receptacle terminal is adapted to move between a first position in which said receptacle terminal is electrically isolated from said load terminal and a second position in which said receptacle terminal is electrically connected to said load terminal, and said miswire prevention mechanism comprises a mechanical latch retaining said receptacle terminal in said first position, wherein activation of said proper wiring detection circuit causes said latch to move to a release position which allows said receptacle terminal to move from said first position to said second position.

6. The ground fault circuit interrupting device of claim 5, further comprising a solenoid adapted to move said latch to said release position when said solenoid is energized.

7. The ground fault circuit interrupting device of claim 5, wherein said mechanical latch comprises a bimetal strip adapted to move to said release position when heated.

8. The ground fault circuit interrupting device of claim 7, wherein said proper wiring detection circuit comprises a heater element adapted to heat said bimetal strip upon activation.

9. The ground fault circuit interrupting device of claim 7, wherein said proper wiring detection circuit causes a current to flow through said bimetal strip to heat said bimetal strip upon activation.

10. The ground fault circuit interrupting device of claim 5, wherein said mechanical latch comprises a shape memory alloy element adapted to move to said release position when heated.

11. The ground fault circuit interrupting device of claim 10, wherein said proper wiring detection circuit comprises a heater element adapted to heat said shape memory allow element upon activation.

12. The ground fault circuit interrupting device of claim 10, wherein said proper wiring detection circuit causes a current to flow through said shape memory alloy element to heat said shape memory allow element upon activation.

13. The ground fault circuit interrupting device of claim 10, wherein said shape memory alloy element comprises Nitinol.

14. The ground fault circuit interrupting device of claim 5, wherein said receptacle terminal is elastically biased towards the second position.

15. The ground fault circuit interrupting device of claim 4, wherein said receptacle terminal is adapted to move between a first position in which said receptacle terminal is electrically isolated from said load terminal and a second position in which said receptacle terminal is electrically connected to said load terminal, and said miswire prevention mechanism comprises a current destructible fuse retaining said receptacle terminal in said first position, wherein activation of said proper wiring detection circuit causes current to flow through said fuse until said fuse blows and mechanically releases said receptacle terminal to move from said first position to said second position.

16. The ground fault circuit interrupting device of claim 15, wherein said receptacle terminal is elastically biased towards the second position.

17. The ground fault circuit interrupting device of claim 4, wherein said receptacle terminal is adapted to move between a first position in which said receptacle terminal is electrically isolated from said load terminal and a second position in which said receptacle terminal is electrically connected to said load terminal, and said miswire prevention mechanism comprises a heat-deformable material attached to said receptacle terminal and retaining said receptacle terminal in said first position, wherein activation of said proper wiring detection circuit causes a heater element to heat said heat deformable material until said heat deformable material deforms and mechanically releases said receptacle terminal to move from said first position to said second position.

18. The ground fault circuit interrupting device of claim 17, wherein said heat-deformable material comprises plastic.

19. The ground fault circuit interrupting device of claim 17, wherein said receptacle terminal is elastically biased towards the second position.

20. The ground fault circuit interrupting device of claim 4, wherein said receptacle terminal is adapted to move between a first position in which said receptacle terminal is electrically isolated from said load terminal and a second position in which said receptacle terminal is electrically connected to said load terminal, and said miswire prevention mechanism comprises a low temperature solder element retaining said receptacle terminal in said first position, and a heater element, wherein activation of said proper wiring detection circuit causes said heater element to heat said solder element until said solder element melts and mechanically releases said receptacle terminal to move from said first position to said second position.

21. The ground fault circuit interrupting device of claim 20, wherein said receptacle terminal is elastically biased towards the second position.

22. The ground fault circuit interrupting device of claim 4, wherein said receptacle terminal is adapted to move between a first position in which said receptacle terminal is electrically isolated from said load terminal and a second position in which said receptacle terminal is electrically connected to said load terminal, and said miswire prevention mechanism comprises a low temperature solder element retaining said receptacle terminal in said first position, wherein activation of said proper wiring detection circuit causes current to flow through said solder element to heat said solder element until said solder element melts and mechanically releases said receptacle terminal to move from said first position to said second position.

23. The ground fault circuit interrupting device of claim 22, wherein said receptacle terminal is elastically biased towards the second position.

24. The ground fault circuit interrupting device of claim 1, wherein said device completes manufacture in said reset condition.

25. The ground fault circuit interrupting device of claim 1, wherein said device can be reset to the reset condition from the tripped condition prior to power being connected to said at least one line terminal.

26. The ground fault circuit interrupting device of claim 1, wherein said proper wiring detection circuit causes said receptacle terminal to become permanently electrically connected to said load terminal after a source of power is connected to said at least one line terminal.

27. The ground fault circuit interrupting device of claim 1, further comprising isolating contacts electrically connected between the at least one line terminal and the at least one load terminal, and wherein said proper wiring detection circuit comprises a load adapted to cause said receptacle terminal to become permanently electrically connected to said load terminal when a current flows from the line terminal and through said isolating contacts and said load.

28. The ground fault circuit interrupting device for preventing miswiring during installation of claim 1, further comprising:
an electrical contact connected between the line terminal and the load terminal, the electrical contact electrically connecting and disconnecting the line terminal and the load terminal, wherein said receptacle terminal becomes electrically connected to said load terminal only when the electrical contact provides an electrical connection between the line terminal and the load terminal.

29. A method of manufacturing a ground fault circuit interrupting device comprising the steps of:
providing said device with at least one line terminal, at least one load terminal and at least one receptacle terminal;
manufacturing said device such that said receptacle terminal is electrically isolated from said load terminal, and mechanically biased towards said load terminal;
providing said device with a retaining unit that retains said receptacle terminal from moving toward and contacting said load terminal until after power is applied to said line terminal;
providing said device with a release unit connected to said receptacle terminal, said release unit releasing said receptacle terminal to contact said load terminal only a first time power is applied to the line terminal at the same time the device is in a reset condition such that said line terminal is electrically connected to said load terminal; and
distributing said device in said reset condition.

* * * * *